United States Patent [19]

Takei

[11] Patent Number: 4,897,588

[45] Date of Patent: Jan. 30, 1990

[54] DOUBLE MOTOR FEED CONTROL SYSTEM

[75] Inventor: Seiji Takei, Yokohama, Japan

[73] Assignee: Nippon Thompson Co., Ltd., Japan

[21] Appl. No.: 222,443

[22] Filed: Jul. 21, 1988

[51] Int. Cl.$^4$ .............................................. G05B 1/06
[52] U.S. Cl. .................................... 318/661; 318/603; 318/600; 318/571; 318/46
[58] Field of Search ............... 318/661, 603, 600, 571, 318/46, 696.1, 685

[56] References Cited

U.S. PATENT DOCUMENTS

| | | | |
|---|---|---|---|
| 3,961,232 | 6/1976 | Newell | 318/46 |
| 4,322,669 | 3/1982 | Fukuma et al. | 318/571 |
| 4,401,930 | 8/1983 | Kato et al. | 318/603 |
| 4,533,859 | 8/1985 | Johnstone | 318/661 |

*Primary Examiner*—William M. Shoop, Jr.
*Assistant Examiner*—Saul M. Bergmann
*Attorney, Agent, or Firm*—Skjerven, Morrill, MacPherson, Franklin & Friel

[57] ABSTRACT

A double motor feed control system for controlling a relative linear feed motion between two objects, such as a rail and a table of a linear motion rolling contact bearing assembly. The double motor feed control system includes a first motor, a threaded feed shaft driven to rotate by the first motor, and a slider assembly threadably connected to the feed shaft. The slider assembly includes a nut which is fitted onto and in thread engagement with the feed shaft, an inner ring fixedly attached to the nut and provided with a rotor, and a motor housing rotatably supported on the rotor through a pair of ball bearings and provided with a stator in opposite arrangement with the rotor to thereby define a second motor. By controlling the direction of rotation of each of the first and second motors, the feed speed may be selectively set at a fast or slow speed.

14 Claims, 3 Drawing Sheets

DOUBLE MOTOR FEED CONTROL SYSTEM

BACKGROUND OF THE INVENTION

1. Field of the Invention

This invention generally relates to a feed control system for controlling the feed motion of an object, such as a table, and, in particular, to a double motor feed control system suitable for use in controlling a relative movement between two objects, such as a table in an X-Y cross table assembly.

2. Description of the Prior Art

A feed control system for controlling the feed movement of a table relative to a base is well known. A typical prior art feed control system is disclosed in the Japanese Patent Laid-open Pub. No. 58-113653 which is hereby incorporated by reference. In the feed control system disclosed in this publication, a plurality of screws different in pitch or lead are formed on a feed shaft which is operatively coupled to a table to feed the table at a fast speed or slow speed selectively. In this case, however, since a plurality of screws or threads must be formed on the same shaft in series, the feed shaft tends to be longer, which, in turn, tends to make the entire system elongated in shape.

SUMMARY OF THE INVENTION

In accordance with the principle of the present invention, there is provided a feed control system comprising a threaded feed shaft which may be driven to rotate by a first motor and a slider assembly which is in thread engagement with the threaded feed shaft and which includes a second motor comprised of a stator unit and a rotor unit. In use, the first motor is fixedly attached to a first object, such as a rail of a linear motion bearing assembly, and the stator unit of the second motor is fixedly attached to a second object, such as a table of the linear motion bearing assembly. Thus, the relative positional relationship between the rail and the table, which slidably moves along the rail, is controlled by the present feed control system.

In the preferred embodiment, the first motor is fixedly attached to a guide rail of a linear motion bearing assembly, such as a linear motion rolling contact bearing assembly, and the threaded feed shaft, preferably a ball screw, is operatively coupled to the driving shaft of the first motor. The slider assembly includes a nut unit, preferably ball nut unit, which is in thread engagement with the threaded feed shaft. The ball nut unit contains a plurality of balls which are partly received in the thread of the ball screw. Thus, as the threaded feed shaft is driven to rotate in one direction, the slider assembly moves along the longitudinal direction of the feed shaft in one direction; whereas, when the feed shaft is driven to rotate in the reversed direction, the slider assembly moves in the opposite direction. The rotor unit of the slider assembly is fixedly attached to the nut assembly so that the rotor unit, together with the nut assembly, rotates around the feed shaft when the feed shaft is driven to rotate. The stator unit is rotatably supported on the rotor unit, for example, through ball bearings or the like, and the stator unit is fixedly attached to the table.

The rotor and the stator defines the second motor, and, thus, a relative rotation between the rotor and the stator may be imparted by energizing the second motor. Such a relative rotation may be produced in either direction. Thus, while the feed shaft is driven to rotate in one direction, if the rotor is driven to rotate in a first direction with respect to the stator, the slider assembly may move at a reduced speed, which thus effectively gives a fine lead or pitch; whereas, if the rotor is driven to rotate in a second direction, which is opposite to the first direction, the slider assembly may move at an increased speed, which thus effectively gives a coarse lead or pitch. In this manner, the effective lead or pitch of the feed shaft may be selectively determined by simply changing the direction of rotation of the rotor unit relative to the stator unit of the second motor.

It is therefore a primary object of the present invention to obviate the disadvantages of the prior art as described above and to provide an improved feed control system.

Another object of the present invention is to provide a novel feed control system capable of selectively setting the effective lead of a feed shaft by simply changing the direction of rotation of a drive motor.

A further object of the present invention is to provide a novel feed control system compact in size, high in accuracy and easy to manufacture.

A still further object of the present invention is to provide a novel feed control system suitable for use in a linear motion rolling contact bearing assembly for controlling the relative positional relationship between a rail and a table.

Other objects, advantages and novel features of the present invention will become apparent from the following detailed description of the invention when considered in conjunction with the accompanying drawings.

DESCRIPTION OF THE PREFERRED EMBODIMENTS

Figure 1:
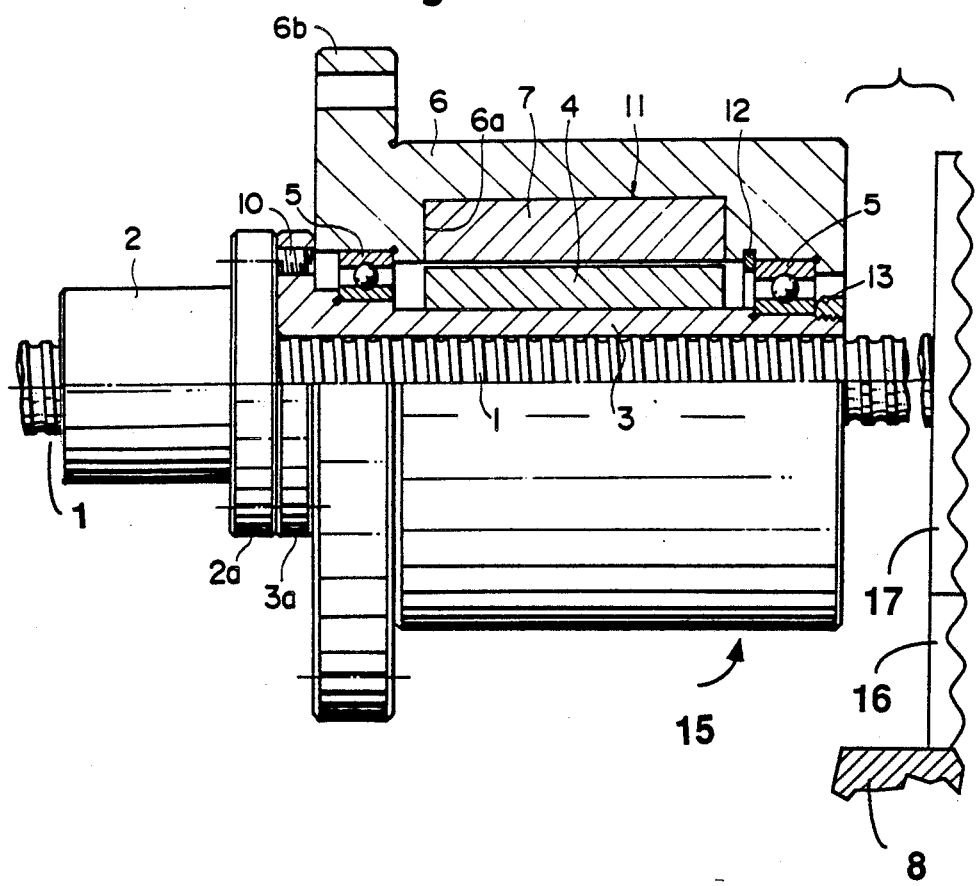
FIG. 1 is a schematic illustration showing partly in cross section a double motor feed control system constructed in accordance with one embodiment of the present invention.

Referring now to FIG. 1, there is schematically shown a double motor feed control system constructed in accordance with one embodiment of the present invention. As shown, the present feed control system includes a feed shaft 1 which is threaded and operatively coupled to a first motor 17 (not shown in FIG. 1), which is preferably a reversible motor. Thus, the feed shaft 1 may be driven to rotate in either desired direction. In the preferred embodiment, the feed shaft 1 is constructed in the form of a ball screw having a thread engageable with balls. The present feed control system also includes a nut assembly 15 which includes a nut 2 which, in turn, is in threaded engagement with the feed shaft 1, so that the nut 2 and thus the nut assembly 15 may move along the feed shaft 1 in either direction as the feed shaft 1 is driven to rotate by the first motor 17. In the preferred embodiment, the nut 2 is comprised of a ball nut containing a plurality of balls (not shown) which are partly received in the thread of the feed shaft 1 to thereby establish a slidable connection between the feed shaft 1 and the nut 2 through the balls.

A flange 2a is formed at one end of the nut 2 and the flange 2a is fixedly attached to a flange 3a formed at one end of an inner ring 3 of a second motor 11 by means of bolts 10. The inner ring 3 is elongated in shape and loosely fitted onto the feed shaft 1. A cylindrical rotor 4 is fitted onto and fixedly attached to the outer peripheral surface of the inner ring 3 approximately at the center thereof. In addition, a generally cylindrical motor housing 6 is mounted on the inner ring 3 through a pair of ball bearings 5 (fixed in place by ring 12 and nut 13) and the housing is formed with a cylindrical recess 6a at the inner surface thereof to receive therein a cylindrical stator 7. Thus, the rotor 4 and the stator 7, together, define the first motor 11. Thus, when the first motor 11 is energized, the rotor 4 is driven to rotate relative to the stator 7 via the ball bearings 5. Thus, while keeping the feed shaft 1 not in rotation, if the first motor 11 is energized to cause the rotor 4 to rotate relative to the stator, the nut assembly 15 will move along the feed shaft 1 in either direction. The motor housing 6 is formed with a flange 6b at one end of its outer peripheral surface, which may be used to have the motor housing 6 fixedly attached to a desired object, such as a table of a linear motion bearing assembly, as will be described more in detail later.

Figure 2:
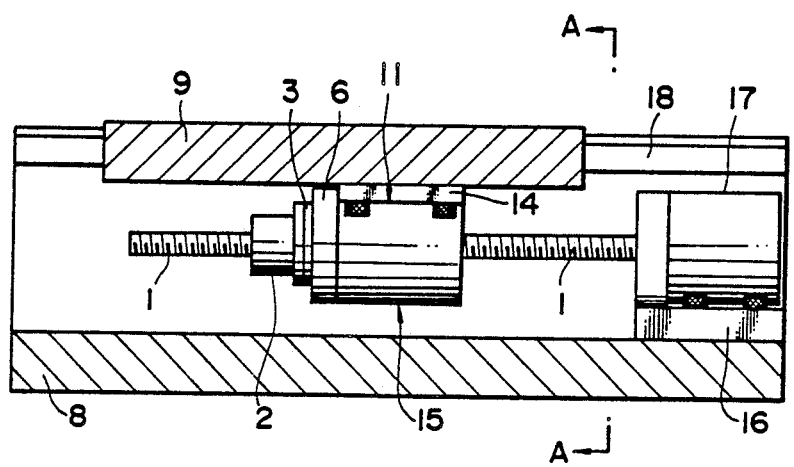
FIG. 2 is a schematic illustration showing a linear motion bearing assembly to which the present double motor feed control system has been advantageously applied.

FIG. 2 illustrates a linear motion bearing assembly to which the present double motor feed control system has been advantageously applied. As shown in FIG. 2, the linear motion bearing assembly includes a bed or rail 8 having a U-shaped transverse cross section and thus it includes an elongated, flat bottom wall and a pair of elongated side walls which extend upright from the opposite sides of the bottom wall. The linear motion bearing assembly also includes a table 9 which is operatively coupled to the rail 8 such that the table 9 may slidingly move along the rail 8. In the preferred embodiment, the linear motion rolling assembly is defined as a linear motion rolling contact bearing assembly, in which case, a pair of guide grooves 18 one on each of the opposite surfaces of the side walls of the rail 8 is defined to define a predetermined travel path and the table 9 is provided with a pair of endless circulation paths provided with rolling members 19 FIGS. 3 and 4, such as balls or cylinders, to provide a rolling contact between the table 9 and the rail 8. Thus, the table 9 may slidingly move along the rail 8 over any desired distance and in any desired direction.

Figure 3:
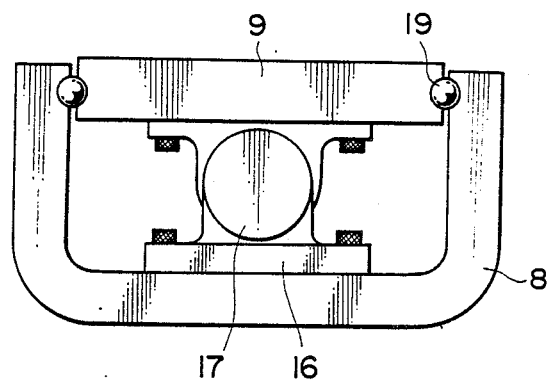
FIG. 3 is a schematic illustration showing in left end view the linear motion bearing assembly of FIG. 2.
Figure 4:
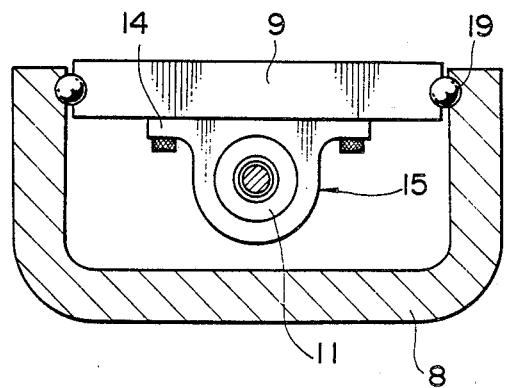
FIG. 4 is a schematic illustration showing the structure of the linear motion bearing assembly of FIG. 2 when taken along line A—A.

In the structure shown in FIG. 2, the first motor 17 is fixedly attached to the bottom wall of the rail 8 through a fixture member 16 such that the feed shaft 1 operatively coupled to the first motor 17 extends in parallel with the longitudinal direction of the rail 8. And, the nut assembly 15 is fixedly attached to the bottom surface of the table 9 through a fixture member 14. FIG. 3 illustrates the right-hand end view of the structure shown in FIG. 2, and FIG. 4 illustrates the structure when viewed in the direction indicated by A—A in FIG. 2.

With the above-described structure, the first and second motors 17 and 11 are operatively coupled to the feed shaft. Thus, while keeping the second motor 11 inoperative, i.e., not in rotation, if the first motor 17 is driven to rotate in a first rotational direction, the feed shaft 1 also rotates in the first rotational direction to thereby cause the table 9 to move in a first linear direction along the rail 8. On the other hand, under the same condition, if the first motor 17 is driven to rotate in a second rotational direction which is opposite to the first rotational direction, the feed shaft 1 also rotates in the second rotational direction to thereby cause the table 9 to move in a second linear direction along the rail 8. Now, while keeping the feed shaft 1 in rotation in the first rotational direction, e.g., clockwise, if the second motor 11 is energized to cause its rotor 4 rotate in the first rotational direction, the speed of the linear motion of the table 9 in the first direction increases. On the other hand, under the same condition, if the second motor 11 is energized to cause its rotor 4 rotate in the second rotational direction, the speed of the linear motion of the table 9 in the first direction decreases. In this manner, the speed of movement of the table 9 along the rail 8 may be selectively set simply by changing the direction of rotation of the rotor 4 of the second motor 11.

As a specific example, let us assume that use is made of a five phase stepping motor (1,000 pulses/rev) for the first motor 17 and use is made of a four phase stepping motor (800 pulses/rev) for the second motor 11 in the structure shown in FIG. 2. In this case, the lead angle of the first motor 17 is $360/1,000 = 0.36°$; whereas, the lead angle of the second motor 11 is $360/800 = 0.45°$. As a result, if the first motor is driven to rotate in the first direction, e.g., clockwise, over one pulse and the second motor 11 is driven to rotate in the second direction, e.g., counterclockwise, over one pulse, the second motor 11 and thus the table 11 moves over the effective lead angle of $0.09°$ ($=0.45° - 0.36°$). Thus, if the feed shaft 1 has a lead of 2 mm, the second motor 11 and thus the table 9 moves at a rate of 0.5 microns/pulse ($=2 \times 0.09/360$), which corresponds to a fine pitch. On the other hand, under the same condition, if the first motor 17 is driven to rotate in the opposite direction, i.e., clockwise, the second motor 11 and thus the table 9 will move at a rate of 4.5 microns/pulse ($=2 \times 8.1/360$), which corresponds to a coarse pitch.

Figure 5:
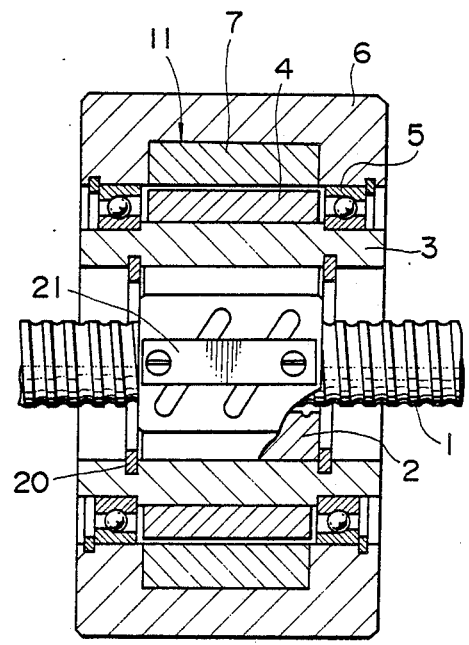
FIG. 5 is a schematic illustration showing a double motor feed control system constructed in accordance with another embodiment of the present invention.

FIG. 5 illustrates a double motor feed control system suitable for use in a linear motion bearing assembly constructed in accordance with another embodiment of the present invention. In the previous embodiment shown in FIG. 1, the nut 2 and the elongated inner ring 3 are axially arranged to define a serial arrangement so as to reduce the overall height of the entire assembly. On the other hand, in the present embodiment, the inner ring 3 is disposed concentrically with the nut 2 radially outwardly thereof. A pair of fixing members 20 is provided to fixedly attach the inner ring 3 to the nut 2. Also provided is a key 21 which is fixedly attached to the nut 2. Other than that, the fundamental structure of this embodiment is similar to that of the embodiment shown in FIG. 1, and, thus, like elements are indicated by like elements without further explanation.

In the above-described embodiments, the nut 2 and the inner ring 3 are separately formed; however, as an alternative structure, both of these elements may be formed integrally, if desired. In the above-described embodiments, use is made of balls as the rolling members of a linear motion rolling contact bearing assembly; however, use may also be made of rollers instead of balls. Moreover, the present feed control system may also be applied to two-dimensional movement table, such as an X-Y cross table, or any other similar apparatuses.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A feed control system for controlling a relative linear movement between two objects, comprising:
   a first driving means to be fixedly mounted on one of said two objects;
   a feed shaft driven to rotate by said first driving means, said feed shaft being threaded at least partly;
   a slider means including a nut in thread engagement with said feed shaft and a second driving means having a rotor fixedly attached to said nut and a stator which is mounted around said rotor and which is to be fixedly mounted on the other of said two objects; and
   wherein said other of said two objects may be driven at increased speed or reduced speed dependent on the relative rotational directions of said first driving means and said second driving means.

2. The system of claim 1, wherein said first driving means is a first motor and said second driving means is a second motor.

3. The system of claim 1, wherein said feed shaft is a ball screw and said nut is a ball nut containing a plurality of balls which are engageable with the thread of said feed shaft.

4. The system of claim 1, wherein said slider further includes an elongated inner ring which is loosely fitted onto said feed shaft and which has one end fixedly attached to an opposite end of said nut, whereby said rotor is fixedly attached to an outer peripheral surface of said inner ring.

5. The system of claim 4, wherein said slider further includes a generally cylindrical motor housing which is fitted onto said inner ring with a pair of ball bearings interposed between said inner ring and said motor housing to thereby allow said motor housing to rotate relative to said inner ring, whereby said stator is fixedly attached to said motor housing.

6. The system of claim 1, wherein said slider further includes an inner ring which is fitted onto and fixedly attached to said nut concentrically, whereby said rotor is fixedly attached to an outer peripheral surface of said inner ring.

7. The system of claim 5, wherein said slider further includes a generally cylindrical motor housing which is fitted onto said inner ring with a pair of ball bearings interposed between said inner ring and said motor housing to thereby allow said motor housing to rotate relative to said inner ring, whereby said stator is fixedly attached to said motor housing.

8. The system of claim 1 wherein said slider means is movable in a first direction by rotation of said feed shaft in one direction and movable in a second direction by rotation of said feed shaft in an opposite direction; and
   wherein when said rotor is simultaneously driven in a first direction, the slider means is movable at a reduced speed to effect a fine lead, and when said rotor is simultaneously driven in an opposite direction, the slider means is movable at an increased speed to effect a coarse lead.

9. The system of claim 8 further including means for changing the direction of rotation of said rotor and wherein the effective lead of the feed shaft is selectively determined by changing the direction of rotation of said rotor.

10. The system of claim 9 in which said one of two objects includes a fixed bed fixedly mounting said first driving means and in which said other of said objects is a table coupled to said bed such that said table moves linearly with respect to said bed and wherein said table is operatively coupled to said stator and said feed shaft.

11. The system of claim 1 wherein said first driving means is attached to said feed shaft adjacent one end of said feed shaft, said nut being in engagement with said feed shaft adjacent an opposite end of said shaft and second driving means extending concentrically around said feed shaft in a position between said nut and said first driving means.

12. The system of claim 11 further including means for coupling said second driving means to said nut.

13. The system of claim 11 in which said first driving means is a motor driving said feed shaft and said second driving means is a motor surrounding said feed shaft.

14. The system of claim 1 including means for rendering said first driving means inoperative and wherein when said first driving means is inoperative, energization of said second driving means in one direction of rotation will move said nut along said feed shaft in one direction and energization of said second driving means in an opposite direction of rotation will move said nut along said feed shaft in an opposite direction.

* * * * *